(No Model.)
J. A. SCOLLAY.
THERMOMETER.
No. 494,651. Patented Apr. 4, 1893.
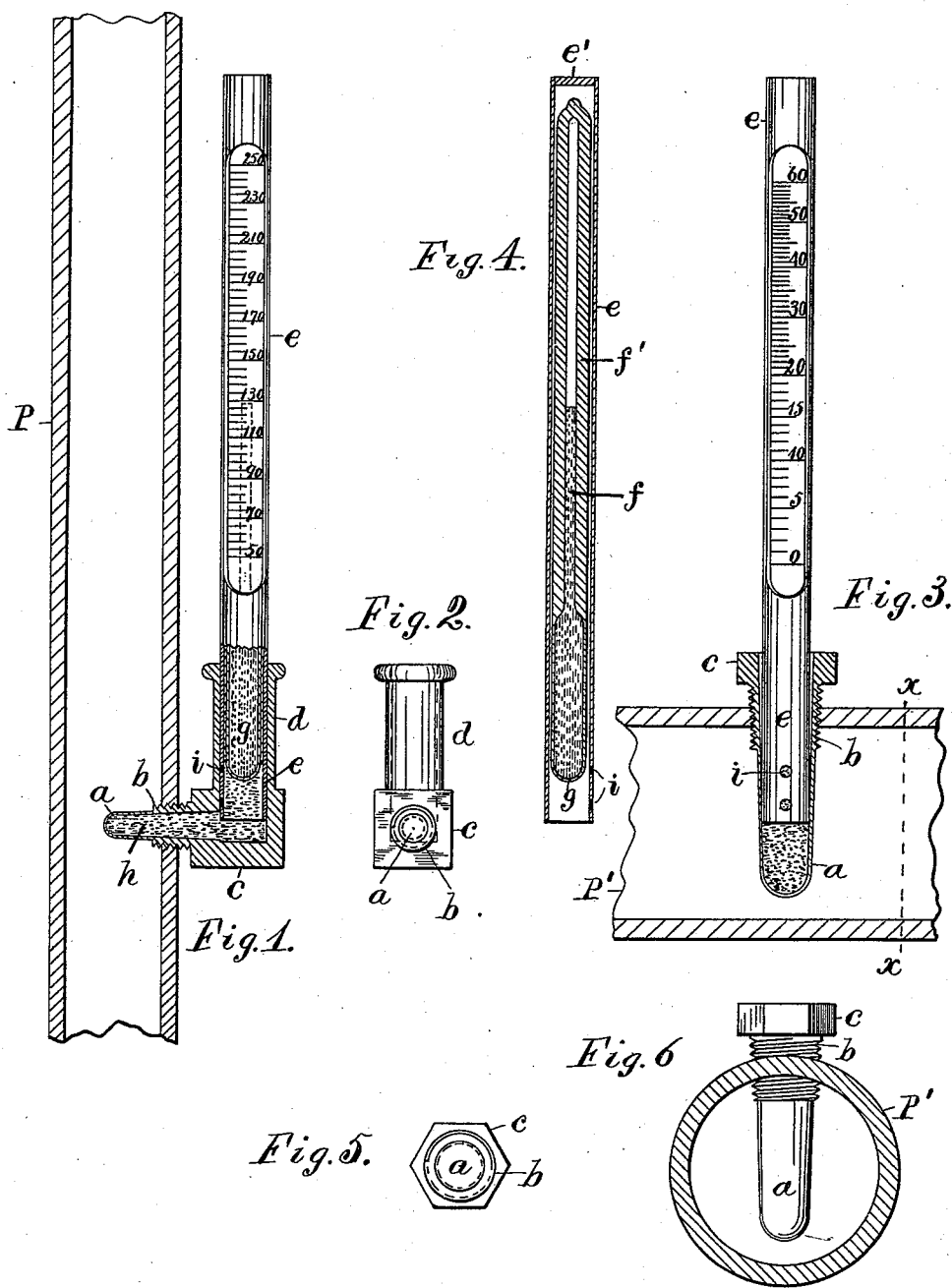
Attest:
Edward Soulav
Edward F. Kinsey.
Inventor.
J. A. Scollay, per
Crane & Miller, Attys.

UNITED STATES PATENT OFFICE.

JOHN A. SCOLLAY, OF BROOKLYN, NEW YORK.

THERMOMETER.

SPECIFICATION forming part of Letters Patent No. 494,651, dated April 4, 1893.

Application filed August 3, 1892. Serial No. 442,086. (No model.)

*To all whom it may concern:*

Be it known that I, JOHN A. SCOLLAY, a citizen of the United States, residing at Brooklyn, in the county of Kings and State of New York, have invented certain new and useful Improvements in Instruments for Determining the Temperature in Steam or Water Pipes, &c., fully described and represented in the following specification and the accompanying drawings, forming a part of the same.

This invention consists primarily in an open-mouthed thermometer cup comprising a thimble of thin metal having a collar of thicker metal provided with an external screw thread to fit a threaded hole in the pipe or plate to which the instrument is applied; whereby it is adapted to hold a thermometer removably, so that the same thermometer may be used, in a series of such cups, to test the temperature at a series of points in a heating or cooling system of apparatus. The mouth of the cup is projected upward and when required a heat conducting liquid, as oil or mercury, is inserted in such cup, and a portable thermometer is provided by incasing the thermometer stem and bulb with a metal tube to protect the same and to conduct the heat to the expansive liquid of the thermometer. The thermometer cup is preferably made to fit such metallic tube snugly, and may be made with a gradual taper internally, so as to admit the thermometer tube readily and to fit it snugly when pressed therein. By such construction a close contact of the thermometer tube and the cup may be secured, and a rapid conduction of the heat to the thermometer may be effected without supplying a conducting liquid within the cup. That portion of the cup which is projected into the circulating fluid is preferably made of very thin metal to conduct the heat with rapidity, and the collar or head of the cup is made of thicker metal to receive an external screw thread and to receive a wrench for turning the same.

In the annexed drawings, Figure 1 shows an upright pipe with the thermometer cup inserted therein, and the thermometer in the cup, with the parts in section at the center line where hatched. Fig. 2 is an end elevation of the thermometer cup shown in Fig. 1. Fig. 3 represents a horizontal pipe with the cup and thermometer applied thereto, the thermometer cup and pipe being shown in section at the center line where hatched. Fig. 4 is a vertical section of the thermometer and its incasing tube at right angles to the plane of Fig. 3. Fig. 5 is a view at the bottom end of the thermometer cup shown in Fig. 3, and Fig. 6 is a side view of the same thermometer cup with an end view of the pipe in section on line $x, x$, in Fig. 3.

In Fig. 1, P represents a pipe containing the fluid whose temperature is to be tested, $a$ is the thimble of the thermometer cup, $b$ the threaded collar, and $c$ the head from the side of which the socket $d$ is projected so as to extend vertically when the thimble is screwed into an upright pipe, as shown in the drawings. A horizontal pipe P' is shown in Fig. 3, with the flange of the thermometer cup screwed into its upper side, and the socket of the cup presented upward, and slightly tapered to receive the metal tube $e$ which incases the thermometer stem $f$ and bulb. $g$ shown in Fig. 4. The stem and bulb of the thermometer are shown of equal diameter to facilitate the fastening of the same within the tube $e$ and to secure a large surface for the application of engraved figures to the glass as shown in Figs. 1 and 3. The thermometer may be secured within the tube by a rubber collar or band between the same, to hold the stem elastically within the tube and thus avoid any injury from expansion. The top of the tube is closed by a block $e'$ to protect the glass of the thermometer, and the tube is extended at the opposite end somewhat beyond the bulb for the same reason, and an aperture is left in the bottom end for the entrance of a conducting liquid, if one be used, as shown at $h$ in Figs. 1 and 3. Holes $i$ may also be formed in the side of the tube to facilitate the admission of the fluid or to discharge the air from the vicinity of the bulb as the fluid enters.

I have discovered that mineral acids are the most suitable fluids for use in a thermometer, as they do not freeze at ordinary temperatures, and boil at temperatures much higher than water. Common oil of vitriol is especially advantageous, as it expands three times as much as mercury with the same rise of temperature, and thus permits the use of a larger bore in the stem, to render the column F' more readily visible. The boiling point of the acid increases with its density, and ranges from 240° Fahrenheit with a specific gravity of 1.30; to 600° Fahrenheit with a specific gravity of 1.84. For testing the heat of water, the cheaper acid may therefore be used, as it boils at a higher temperature than water, while the more expensive acid, of greater density, may be used to test the temperature of steam up to 600° Fahrenheit. By employing this acid for the expansive liquid in my thermometer, I am enabled, by its higher ratio of expansion, to use a stem of much larger bore than with mercury, and to thus render the column $f'$ more readily visible within the stem. The acid may be readily colored if desired.

The scale is marked directly upon the glass of the stem, and in Fig. 1 indicates degrees Fahrenheit of temperature; while the scale in Fig. 3 indicates pounds of pressure per square inch above the atmosphere, the points upon the scale being determined in correspondence with degrees of temperature which produce such pressures in steam boilers.

It will be noticed that the thimble $a$ projects from the collar $b$ so as to extend within the receptacle or pipe whose temperature is to be tested, when the collar is screwed into a threaded aperture in the side of such receptacle, and where the socket is in line with the thimble as shown in Fig. 3, the thermometer may be inserted within the thimble and thus be exposed almost directly to the heat of the surrounding fluid. In such case no conducting liquid is required within the thimble, but where the socket is formed at right angles with the thimble as shown in Fig. 1, a conducting liquid is useful to convey the heat from the thimble to the socket and the thermometer resting therein.

A series of open-mouthed thermometer cups may be inserted at various points in a system of pipes and receptacles containing a hot or cold fluid, and the same thermometer may be used to ascertain the temperature of the fluid at any of such points without displacing any fixtures or disturbing the connection of the cup with the pipe or receptacle to which it is attached. By casing the thermometer in a metallic tube it is adapted for handling, and for repeated application to a series of such cups or sockets, without injury or derangement, and requires no case or box to protect or inclose it when in transit. It thus affords a means of indicating the temperature at any time to an authorized person provided with a suitable thermometer, whereas a thermometer permanently fixed in a pipe or vessel would afford an indication of the temperature to others than the authorized party.

Heretofore, the thermometers constructed for insertion within pipes and receptacles have been connected permanently with the screwed socket so that an injury to the thermometer could be repaired only by entirely removing such socket and furnishing a new thermometer and socket, which would not only necessitate a considerable expense, but the lowering of the pressure in the pipe and the discharge of its contents. The use of such thermometers at numerous points in a system of pipes would involve great expense, from the number of instruments required, while a single thermometer only is required with a series of open cups. Mercury has been found to operate much more efficiently than any other liquid, to conduct the heat within the thimble $a$ to the thermometer bulb $g$; but such liquid has a corrosive effect upon most metals excepting iron. This metal is not suited for incasing a thermometer tube as it is so liable to rust when exposed to steam or dampness, and I therefore prefer to use aluminum for the casing tube $e$. This metal is not affected by mercury and is a good conductor of heat, and is thus especially adapted for use in connection with the thermometer cup. The thimble $a$ may also be made of aluminum and secured within the collar $b$ and head $c$ in any suitable manner. Such construction is shown in Fig. 3, the aluminum being indicated by the black line forming the cup $a$.

Having thus set forth the nature of my invention, what I claim herein is—

1. An open mouthed thermometer cup consisting in a thimble of thin metal, a collar of thicker metal provided with an external screw thread, a head for turning the same, and the socket of the thermometer cup projecting at right angles from the head and communicating with the interior of the thimble, as and for the purpose set forth.

2. An open-mouthed thermometer cup provided with an external flange with screw for insertion in a threaded aperture, in combination with a thermometer having the bulb inclosed in a metal tube, and the tube fitted snugly to the bore of the thermometer cup, as and for the purpose set forth.

3. An open-mouthed thermometer cup formed with a gradually tapering socket, in combination with the thermometer having the bulb inclosed in a metal tube adapted to fit snugly and removably within the tapering socket, as and for the purpose set forth.

4. A thermometer having the bulb filled with mineral acid, as and for the purpose set forth.

In testimony whereof I have hereunto set my hand in the presence of two subscribing witnesses.

JOHN A. SCOLLAY.

Witnesses:
 JOSEPH M. STOUGHTON,
 THOMAS S. CRANE.